July 16, 1935. L. A. TAYLOR 2,008,522
RADIO RECEPTION AND DIRECTION FINDING SYSTEM
Filed June 12, 1931

Inventor:
Laurens A. Taylor,
by Charles E. Mullen
His Attorney.

Patented July 16, 1935

2,008,522

UNITED STATES PATENT OFFICE 2,008,522

RADIO RECEPTION AND DIRECTION FINDING SYSTEM

Laurens A. Taylor, Schenectady, N. Y., assignor to General Electric Company, a corporation of New York Application June 12, 1931, Serial No. 543,907

5 Claims. (Cl. 250—11)

My invention relates to radio reception and direction finding systems, more particularly for use on aircraft, and it has for one of its objects to provide a simple, economical and practical means whereby a common radio receiving apparatus employed on an aircraft for non-directive reception, as for receipt of messages, weather reports, etc., may also be employed for determining the direction from which the received signals are transmitted.

A further object of my invention is to provide a novel coupling means whereby a loop may be connected to the signal translating apparatus for either directive, or non-directive reception.

Still a further object of my invention is to provide means whereby the loop employed for directive reception may be mounted directly upon and in close proximity to the metallic wing structure of the craft and at the same time operate satisfactorily for directive purposes.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an embodiment of my invention; and Figs. 2 and 3 represent methods of mounting the loop antenna employed in the arrangement shown in Fig. 1 upon aircraft.

Figure 1:
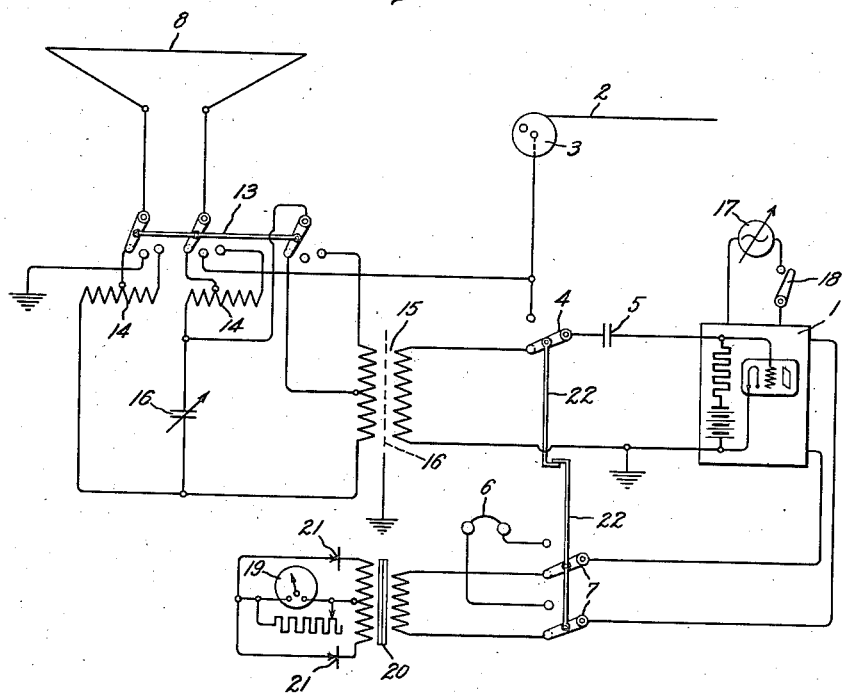

Referring to Fig. 1 of the drawing, I have shown at 1 a radio receiver which may be one of any of the usual constructions employed on aircraft for the reception of messages, weather reports, and the like. I have also shown at 2 a non-directive antenna which may, for example, be one of the trailing type, and which is arranged to be controlled by means of a reel 3 and to be connected to the input of the radio receiver by means of a switch 4 through a blocking condenser 5. For purposes of clarity, the condenser 5 is shown connected to the grid of the first discharge device of the receiver, the cathode of which is connected to ground. A pair of head-phones 6 is arranged to be connected to the output circuit of the receiver through a double throw switch 7. As thus arranged the receiver is adapted for ordinary non-directive radio reception, the received oscillations being impressed upon the antenna 2 and supplied through the blocking condenser 5 to the input of the receiver where they are amplified and detected and the audio currents, reproduced in the output circuit thereof, supplied to the head-phones 6.

To provide means whereby the radio receiver 1 may also be employed for determining the direction of the source of the received signals, a loop antenna 8 is also arranged upon the craft, means being provided whereby the loop antenna may be coupled to the input of the radio receiver either for directive or non-directive reception.

Figure 2:
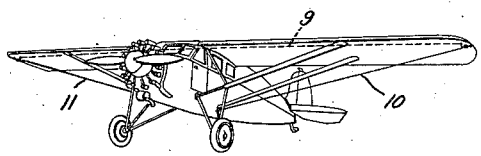
Figure 3:
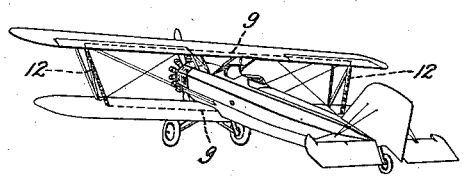

The antenna 8 may be arranged in any suitable way upon the shaft, but preferably it is arranged upon the wings, as shown in Figs. 2 and 3. Thus, for example, if the craft is one of the monoplane type, the loop may comprise a conductor extending from end to end of the wing thereof, as indicated by the dotted line 9 in Fig. 2. The outer ends of this conductor, at points remote from the fuselage, may then be connected by additional conductors 10 and 11 to a point low on the fuselage of the air craft and thence carried into the cockpit and connected to the receiving equipment. As thus arranged the conductors 9, 10 and 11 comprise the loop which is employed in accordance with my invention. It will of course be understood that this loop may comprise a single turn or a plurality of turns as desired.

In Fig. 3, I have shown a similar arrangement for use upon a craft of the biplane type, the loop comprising one or more conductors 9 arranged upon the wings and extending lengthwise thereof, the outer ends of the conductors on the two wings being connected together by additional conductors 12, which may be carried along one of the wing struts, or supports, these conductors all being indicated by dotted lines in Fig. 3.

The loop 8 is arranged to be connected to the receiver 1 either for directive or non-directive reception by means of switches 13 and 4 and a coupling device indicated as a transformer 15. When the switch 13 is in either its right-hand position or its left-hand position, the loop is connected through tuning, or loading, inductances 14 to the primary winding of a transformer 15, the secondary winding of which is connected across the input of the radio receiver through the switch 4 in its lower position. The amount of inductance 14 which is connected in circuit with the loop, and likewise, the number of turns upon the winding of the transformer 15 which are employed, may be varied by operation of the switch 13 from its left-hand position to its right-hand position, thereby to adjust the loop for operation at different wave lengths. Thus at short wave lengths the switch will be in its left-hand position, whereas at long wave lengths the switch will be in its right-hand position. A condenser 16 is connected across the primary winding of the transformer 15 thereby to tune the circuit of the loop to the frequency which it is desired to receive. To cause the loop to operate with the desired degree of directivity, the transformer 15 has an electrostatic shield 16 between its primary and secondary windings, which shield is connected to ground. The purpose of this shield is to prevent electrostatic effects between the primary winding and the secondary winding and to permit arrangement of the primary winding in such a way that opposite sides of the central point thereof are equally balanced capacitively with respect to ground.

While I have particularly mentioned the use of a transformer as the coupling device 15, it will be understood that other forms of coupling means may be employed, it being necessary only that the input terminals thereof be balanced with respect to ground.

As thus arranged the circuit of the loop comprises the condenser 16, the two tuning, or loading, coils 14 and the loop structure, all connected in series, the coupling device being connected directly across the condenser. The two coils 14 are connected in opposite sides of the circuit and are so arranged as to maintain the capacitive balance of the loop with respect to ground. The condenser 16 is also of such construction that the capacitive balance of the loop circuit is maintained. The loop 8 is connected between the two inductances. In this way the voltage across the loop, or the voltage between any portion of the loop conductor and ground is very small, the principal voltage of the loop circuit being set up across the condenser 16 and the input to the coupling device. This is very important to the use of a wing loop of the type which I have described since it permits mounting of the loop directly upon the metal wing struts and supports. For example, it might be expected that a loop arranged directly upon the metal framework of the craft would be affected thereby and would be of such high impedance that it would be unsatisfactory or inoperative for directive purposes. I have found, however, that with my arrangement, as thus described, very satisfactory operation of the loop for purposes of direction finding may be had notwithstanding the fact that the loop is mounted directly upon the metallic members of the framework of the craft. This further permits the loop to be stream lined into the structure of the craft, if desired, so as to offer practically no wind resistance and to be substantially unnoticeable upon the craft.

The transformer 15 is then one having high mutual inductance thereby effectively to transfer the loop circuit directly between the grid and cathode of the input discharge device.

To produce non-directive reception from the loop, a number of different expedients may be employed. It has been found satisfactory, for this purpose, to destroy the balance of the loop by grounding one side thereof and to connect the opposite side to the ungrounded input terminal of the receiver. This is done by operating the switch 13 to the middle position and the switch 4 to the upper position.

When the switch 13 is in its middle position, one side of the loop is connected through the left-hand blade of the switch to ground; i. e., to the fuselage of the craft. The opposite side of the loop is connected directly through the switch 4, in its upper position, to the input grid terminal of the radio receiver. As thus connected the loop has very little or no directive effect and may be employed, for example, for the reception of weather reports and the like.

The receiver 1 may be of any suitable construction such as is commonly employed upon aircraft for the reception of messages, such as weather reports. Where the receiver 1 is of the simple tuned radio frequency and detector type, the detector preferably should be regenerative and so arranged that an audio beat note may be produced in the detector between the received oscillations and oscillations generated in the detector, this audio note having an intensity substantially greater than currents produced in the detector due to modulation of the carrier wave, as for example, the frequencies corresponding to the program or message with which the received carrier is modulated. If the receiver be of the superheterodyne type, then the second detector is preferably regenerative and is so arranged that the desired beat note is produced between the oscillations generated in the detector and the intermediate frequency supplied thereto. If the receiver be one in which the detector is not regenerative, then a separate source of oscillations, as indicated at 17, may be employed, this source of oscillations being of variable frequency and arranged to be connected to the input of the detector of the receiver by means of a switch 18 whereby the desired audio beat notes are produced. In any case the intensity of beat note so produced varies with the intensity of the carrier wave supplied to the input of the receiver which in turn, with the switch 13 in either its right or left hand position, varies as the craft changes direction with respect to the direction of propagation of the received waves.

It is preferable that the indication of direction should be produced by visual means and to this end a visual indicating device 19 is provided, this indicating device being connected between the midpoint of the secondary winding of a transformer 20 and both of the opposite terminals thereof through unilateral conducting devices 21. These devices may be of the copper oxide rectifier type, such as shown in United States Patent No. 1,640,335 to Lars O. Grondahl, issued August 23, 1927. The primary winding of the transformer 20 is arranged to be connected to the output circuit of the receiver through the switch 7 when in its lower position. Thus by means of the switch 7, either the headphones 6 or the meter 19 may be connected to the output circuit of the receiver.

To explain the operation of my invention, let us suppose that the antenna 2 is reeled in and that the operator desires to ascertain his direction with reference to a broadcasting station thereby to determine a route to follow, or with reference to two or more stations thereby to determine his present location, as by triangulation. He first throws the switch 4 to its upper position and the switch 13 to its central position thereby to employ the antenna 8 as a non-directive antenna. He then tunes the radio receiver 1 to the frequency of the station in the direction of which he wishes to guide the craft. This station may be, for example, a broadcasting station in the vicinity of his destination. Having ascertained that the station is transmitting a signal which is being picked up by the loop, he adjusts the receiver 1 to produce the above-mentioned beat note in the output circuit thereof. He then throws switch 4 to the lower position and switch 13 either to the left-hand position, or to the right-hand position dependent upon the frequency of the received carrier wave, and adjusts the condenser 16 to produce maximum response from the meter 19. If it so happens that his plane is directly upon the course leading to the broadcasting station, the direction of which he desires to determine, little or no response will be produced by the meter, but as the plane turns either to the right or to the left of the course, the indication of the meter will be increased thereby informing the pilot that he is off the course. If, to get back on the course, he turns the craft in the wrong direction, he will be informed to that effect by an increased deflection of the meter. Thus to follow the course the operator will guide the craft in such a way as to maintain the indication of the meter at a minimum.

While very satisfactory non-directive reception of messages, reports, etc., may be had with switch 13 in its middle position, switch 4 in its upper position and antenna 2 reeled in, somewhat better reception may be had with the antenna 2 reeled out. The signal currents produced in the output of the receiver 1 with the antenna out may be of such intensity that if the meter 19 be connected thereto it is likely to be injured or destroyed. This is also likely to occur with the antenna in when the craft is in close proximity to broadcasting stations. To avoid this difficulty a suitable interlock is provided between switches 4 and 7, which is conventionally indicated in the drawing as a pair of rods 22 having mutually engaging feet thereon and so arranged that when the switch 4 is in its upper position the switch 7 is also locked in its upper position thereby permitting reception only with the head-phones. When the switch 4 is in its lower position the switch 7 may be in either position thereby permitting reception either by use of the head-phones or the meter.

It will thus be seen that in accordance with my invention, means are provided whereby the receiver which is ordinarily employed upon aircraft may be employed for direction finding purposes with the addition of a very small amount of auxiliary equipment. This additional equipment may conveniently be mounted in a small box upon the side of the cockpit of the aircraft within the easy reach of the operator. I have found through actual flights with equipment of the type described that very satisfactory determinations of direction can be made from the non-directive signals transmitted from ordinary broadcasting stations.

While I have shown a particular embodiment of my invention, it will of course be understood that I do not wish to be limited thereto, since many modifications, both in circuit arrangement and in the instruments employed, may be made without departing from the spirit and scope of my invention, as set forth in the appended claims.

What I claim as new and desire to secure by Letters Patent of the United States, is,—

1. A loop circuit for aircraft, comprising a condenser, a loop, and a pair of loading coils all connected in series and tunable to the frequency to be received, said loop being mounted in proximity to the metallic portions of the wing structure of the craft, and said loading coils being connected between each side of the loop and said condenser and having sufficient inductance to maintain the voltage of the loop at a relatively small value with respect to the voltage on said condenser whereby the loop is substantially unaffected by the metallic portions of the craft, receiving equipment including a transformer having input terminals capacitively balanced with respect to ground, said input terminals being connected across said condenser, and said condenser and loading coils being so arranged that opposite sides of said loop circuit are maintained capacitively balanced with respect to ground.

2. In a direction finding and signal receiving system, a loop antenna, a signal translating device, signal indicating means connected to said signal translating device, means for connecting said loop antenna between the terminals of said signal translating device to produce substantially non-directive reception, a coupling device having its input capacitively balanced with respect to ground and its output connected to said signal translating device, and means for connecting said loop antenna terminals to the input terminals of said coupling device and to disconnect said terminals from said signal translating device thereby to produce directive reception.

3. In combination, a loop, a signal translating device comprising an input electron discharge device having a cathode connected to ground and a grid, means to connect said loop between said grid and ground thereby to produce non-directive reception, a transformer having primary and secondary windings, said connecting means being arranged to disconnect said loop from said grid and ground and to connect it across said primary winding and to connect said secondary winding between said grid and ground thereby to produce directive reception.

4. A loop antenna, signal translating apparatus, means to connect said loop antenna to said signal translating apparatus in such a way as alternately to produce directive and non-directive response, visual indicating means, audible indicating means, means alternately to connect said visual and audible indicating means to said translating device in accordance with the type of response for which said first connecting means is operated to produce, and interlocking means between said two connecting means to prevent connection of said visual indicating means to the receiver when said loop is connected thereto to produce non-directive response.

5. In a direction finding system, a loop rigidly mounted upon a mobile craft, a signal translating device having input and output circuits, means alternately to connect said loop to said input circuit in such a way as to produce relatively non-uniform and uniform reception as the craft changes direction with respect to the direction of propagation of received waves, said translating device including a detector normally arranged to demodulate the received carrier wave and supply signal currents to said output circuit, means to produce local oscillations and to cause said detector to produce a beat note between said local oscillations and the carrier received by said translating device having intensity substantially greater than signal currents produced from the carrier wave by detection, and indicating means responsive to the output currents of said translating device whereby an indication may be produced dependent upon the modulation of the said received carrier when said connecting means is operated for uniform reception and dependent upon the intensity of said received carrier when said connecting means is operated for non-uniform reception.

LAURENS A. TAYLOR.